US006935791B2

(12) United States Patent
Ban et al.

(10) Patent No.: US 6,935,791 B2

(45) Date of Patent: Aug. 30, 2005

(54) APPARATUS AND METHODS FOR MICRO-POSITIONING AND ALIGNMENT

(75) Inventors: Vladimir Sinisa Ban, Princeton, NJ (US); Boris Leonidovich Volodin, West Windsor, NJ (US)

(73) Assignee: PD-LD, Inc., Pennington, NJ (US)

( * ) Notice: Subject to any disclaimer, the term of this patent is extended or adjusted under 35 U.S.C. 154(b) by 0 days.

(21) Appl. No.: 10/219,183

(22) Filed: Aug. 15, 2002

(65) Prior Publication Data

US 2003/0072541 A1 Apr. 17, 2003

Related U.S. Application Data

(60) Provisional application No. 60/312,913, filed on Aug. 16, 2001.

(51) Int. Cl.[7] .............................. G02B 6/36; G02B 6/26

(52) U.S. Cl. .............................. 385/90; 385/52; 385/67

(58) Field of Search .............................. 385/52, 67, 90, 385/62, 91, 137, 139, 66, 84, 92

(56) References Cited

U.S. PATENT DOCUMENTS 3,396,343 A * 8/1968 Wesselink ................... 372/107
3,936,143 A 2/1976 Sato ......................... 350/96 C
4,215,937 A 8/1980 Borsuk ...................... 356/73.1
4,239,333 A 12/1980 Dakss et al. ............. 350/96.21
4,398,797 A * 8/1983 Wedertz et al. ............. 385/137
4,747,657 A 5/1988 Chaoui et al. ............. 350/96.2
5,548,676 A * 8/1996 Savage, Jr. .................. 385/92
5,619,609 A 4/1997 Pan et al. ................... 385/136
5,812,258 A * 9/1998 Pierson ....................... 356/153
6,184,987 B1 2/2001 Jang et al. .................. 356/388
6,470,120 B2 * 10/2002 Green et al. .................. 385/52

OTHER PUBLICATIONS

Mobarhan, K.S. et al., "Laser Diode Packaging Technology: Coaxial Module Assembly", *Newport Corporation, Irvine CA. 92606*, Distributed by Newport Corporation, 4 pages.

PCT International Search Report dated Jan. 6, 2003 (PCT/US02/25892).

* cited by examiner

*Primary Examiner*—Edward J. Glick
*Assistant Examiner*—Krystyna Suchecki
(74) *Attorney, Agent, or Firm*—Woodcock Washburn LLP

(57) ABSTRACT

A fiber optic module according to the invention includes a housing, a light source, a positioning device, and an optical fiber. The housing defines interior and exterior regions of the module. The housing has a source receiving aperture and a fiber receiving aperture. Each aperture extends from the exterior region of the module to the interior region thereof. The light source is attached to the housing and extends at least partially into the interior region of the module through the source receiving aperture. The positioning device is attached to the housing and extends at least partially into the interior region of the module through the fiber receiving aperture. The positioning device has a central axis, an outer diameter that is substantially equal to the diameter of the fiber receiving aperture, and a bore extending through at least a portion thereof. The bore has an axis that is eccentric with respect to the central axis. The optical fiber is fixedly coupled to the positioning device and extends at least partially through the bore.

21 Claims, 14 Drawing Sheets

100
108
114
120
128
126
112
110
124
103
d
106
122
101
105
102
104
116
125
118
127

APPARATUS AND METHODS FOR MICRO-POSITIONING AND ALIGNMENT

CROSS-REFERENCE TO RELATED APPLICATIONS

This application claims priority from Provisional U.S. Patent Application No. 60/312,913, filed Aug. 16, 2001, the contents of which are hereby incorporated herein by reference.

FIELD OF THE INVENTION

The invention is related generally to mechanical micro-positioning and alignment devices. In preferred embodiments, the invention provides apparatus and methods for micro-positioning and alignment of fiber optic cables using a coaxial positioning device.

BACKGROUND OF THE INVENTION

Fiber optic cables have been developed as a medium to transfer information within a communication system. Typically, an optical fiber is linked to a target, such as an optical transmitter, an optical receiver, another optical fiber, or the like. A typical optical transmitter includes electronic circuitry that drives a light source, such as a laser diode. The laser diode emits a modulated light beam that travels through the fiber optic cable to an optical receiver, such as a photodetector.

FIG. 1A is an exploded view, and FIG. 1B is a partial cut-away view, of a known fiber optic module 10. The module 10 can include a metallic package housing 14 that contains a titanium oxide (TO)-can laser diode module 11 having a plurality of electrical contact pins 12 that extend from the package housing 14. The contact pins 12 can be soldered to a printed circuit board assembly (not shown), which can include electronic circuits, such as driver amplifiers, for example, that are thereby electrically connected to the module 10. The package housing 14 can also contain a graded-index (GRIN) lens 16.

An optical fiber 18 extends at least partially through a metallic fiber ferrule 20, which extends through a metallic weld sleeve 22. The weld sleeve 22 is laser-welded to the package housing 14 at each of a plurality of spot weld points 24, and to the ferrule 20 at each of a plurality of spot weld points 26. The laser diode module 11 is laser-welded to the package housing 14 at each of a plurality of spot weld points 28.

According to Mobarhan, et al., the following laser-welding process can be used to manufacture the module 10 (see Mobarhan, et al., "Laser Diode Packaging Technology: Coaxial Module Assembly"). First, the device is loaded onto a laser welding machine. The laser diode module is then spot welded to the package housing. Initial light coupling and a coarse 2-dimensional alignment of the optical fiber to the laser diode waveguide are then performed. The alignment of the optical fiber to the laser diode waveguide is then optimized in three dimensions. The optical fiber assembly, which includes the optical fiber, the fiber ferrule, and the weld sleeve, is then laser welded to the laser diode module. The completed module is then unloaded from the laser welding machine.

In such a technique, however, forces generated by the laser welding can disrupt the alignment of the laser diode module and the optical fiber. This disruption occurs because, as can easily be seen in FIG. 1B, the optical fiber assembly is free to move with respect to the laser diode module.

It is well known, however, that accurate alignment of the optical fiber with the target minimizes optical power losses. Typically, the fiber is adjusted during the alignment process by an operator who manually moves the fiber. Such adjustments are typically performed both before and after the fiber is laser welded to a housing to form a fiber optic module. Manual adjustment of the fiber requires a certain level of skill and patience. Additionally, as each second of assembly time increases the cost of mass producing such a fiber optic module, it would be desirable to minimize the amount of time required to align the optical fiber with the target.

Consequently, numerous fiber optic modules have been developed that package the laser diode and the fiber cable in a manner whereby the cable is aligned with the diode. By way of example, U.S. Pat. No. 5,619,609 ("the Pan patent") discloses a fiber optic module that includes a clip that is used to align the fiber with a laser diode. The position of the fiber is varied until a receiver unit detects a predetermined amount of optical power that corresponds to an optimal alignment position of the cable. The fiber is then removed from the package and the clip is placed on a package substrate. The fiber is re-inserted into the module and onto the clip. The fiber is then adjusted until a maximum optical power is detected to indicate alignment between the fiber and the laser diode. The clip is then laser welded to the substrate. The fiber is once again adjusted until it is aligned with the laser diode. A ferrule is then laser welded to four corners of the clip. Such an assembly process can require significant manual intervention and, therefore, can be considerably time-consuming.

As discussed in the Pan patent, the laser welding process creates local heating and shrinkage that can shift the position of the ferrule. The power and paths of the laser beams used to laser weld the ferrule to the clip can be adjusted to fine tune the position of the fiber optic cable. U.S. Pat. No. 4,747,657 ("the Chaoui patent") discloses a process for fine adjustment and alignment of a fiber optic cable subassembly with an optical device subassembly utilizing the shrinkage and shifting of the parts during the laser welding process. Such a technique is sometimes referred to as "laser hammering."

The subassemblies of the Chaoui patent are initially laser welded together at two opposite points of adjoining mating surfaces. Light is transmitted through the fiber and detected during the alignment process. An additional laser weld is then created adjacent to one of the initial weld locations. The shrinkage created by the additional weld spot will further shift the fiber cable toward the direction of the spot. Light transmitted through the fiber is then detected to determine whether there was an increase or decrease in light intensity. If the light intensity increases, an additional weld spot is created adjacent to the two previous weld locations. If the light intensity decreases, a weld spot is created adjacent to the other initial weld location. This iterative process continues until the fiber is aligned with the laser diode. This process, however, is time consuming and ultimately increases the cost of mass producing fiber modules.

Similarly, U.S. Pat. No. 6,184,987 ("the Jang patent") discloses a process for laser welding a ferrule of a fiber optic cable to a clip of a fiber module. The process can detect and correct a movement of the fiber optic cable so that the fiber is aligned with a light source such as a laser diode. The detection method includes the steps of mechanically moving the ferrule with an automated device after the laser diode is welded to the module housing, and then detecting a change in optical power of a light beam that is transmitted through the fiber optic cable. The detection can determine a direction that the ferrule shifted during the weld process. The shift of the ferrule can be corrected by subsequent laser welds of the ferrule and clip. This process, too, can be time consuming and expensive.

It would be advantageous to mass producers of such fiber optic modules, therefore, if movement of the optical fiber were constrained with respect to the target during the laser welding process. Thus, there is a need in the art for apparatus and methods for micro-positioning optical fiber assemblies so as to align them with targets, such as laser diodes, other optical fibers, optical receivers, or the like, in a manner such that the alignment between the optical fiber assembly and the target is maintained when the fiber is laser welded to the package housing.

SUMMARY OF THE INVENTION

Certain preferred embodiments of the invention will now be described in detail with reference to the figures. Those skilled in the art will appreciate that the description given herein with respect to the figures is for exemplary purposes only and is not intended in any way to limit the scope of the invention. All questions regarding the scope of the invention may be resolved by referring to the appended claims.

Figure 1B:
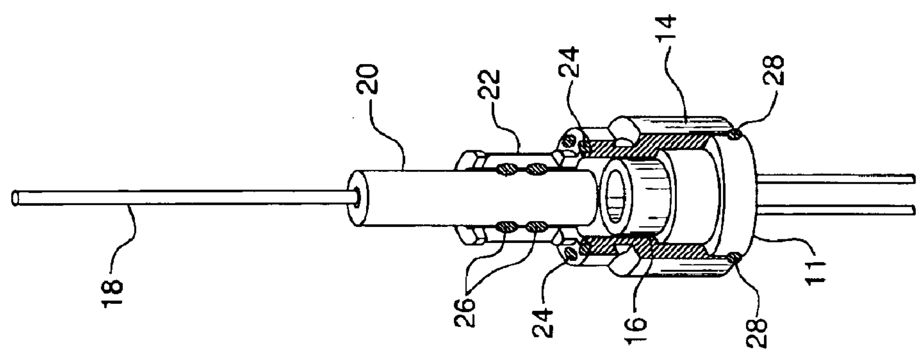
FIGS. 1A and 1B are an exploded view and a partial cut-away view, respectively, of a known fiber optic module.
Figure 1A:
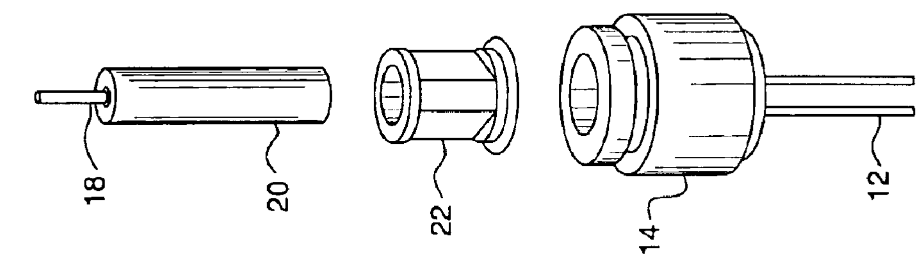

Generally, the invention pertains to apparatus and methods for micro-positioning and alignment. A positioning device according to the invention is particularly suitable for aligning an optical fiber with a target during the manufacture of a fiber optic module. It should be understood that a “target,” as that term is used in conjunction with this specification, is not necessarily a recipient of light (though it could be). The term “target” is used herein to describe that with which the optical fiber is to be aligned. For example, the target can be a light source, such as a laser diode, for example, in which case the optical fiber receives light from the target, or a light receptor, such as an optical receiver, for example, in which case the optical fiber transmits light to the target. The target can be both a light source and a light receptor, such as in the example of a bi-directional package wherein light of a first amplitude can be transmitted in a first direction (e.g., from the optical fiber to the target), and light of a second amplitude can be simultaneously transmitted in a second direction (e.g., from the target to the optical fiber). The target can also be another optical fiber, for example, such as might be found in a package designed to align two optical fibers, each or both of which can carry light in either or both directions.

Preferably, the positioning device is sized and shaped so that it can receive a fiber optic cable and ferrule, and also to minimize or, more preferably, to eliminate any gaps that might exist between the fiber optic cable and the housing to which the optical fiber is to be affixed. In this way, the optical fiber can be restricted in its movement within the package so that the forces generated by laser welding do not cause the optical fiber to move out of alignment with the target by any unacceptable amount when the positioning device is laser welded to the housing. That is, as will be described in greater detail below, the package is designed to provide as much surface-to-surface confinement in the x-y plane (i.e., the plane that is generally perpendicular to the axis of the fiber) as possible. Such confinement minimizes the possibility of the fiber’s shifting in the x-y plane by minimizing the space between components. Apparatus according to the invention can also confine the fiber so as to restrict its movement along the z-axis (i.e., generally parallel to the axis of the fiber).

Consequently, during the manufacture of an optical fiber module, the optical fiber can be aligned with a target, such as a light source, light receptor, another optical fiber, or the like, and then laser welded to the housing without moving out of alignment during the laser welding process. That is, the optical fiber can be inserted into and affixed to the ferrule (e.g., by epoxy), and the ferrule can be inserted into and affixed to the positioning device. After the optical fiber is aligned with the target, the positioning device can be laser welded to the housing. This is desirable because, in the prior art, after the fiber is aligned with the target and the target is welded to the housing, the forces from the laser welding can cause the optical fiber and the target to move out of alignment. Using a positioning device according to the invention, however, the optical fiber can be realigned with the target after the target is affixed to the housing, and then the positioning device can be laser welded to the housing without affecting the alignment. This is particularly desirable for mass-production of such optical fiber modules because laser welding is a much more efficient process for affixing the optical fiber to the housing than is using epoxy.

Figure 2B:
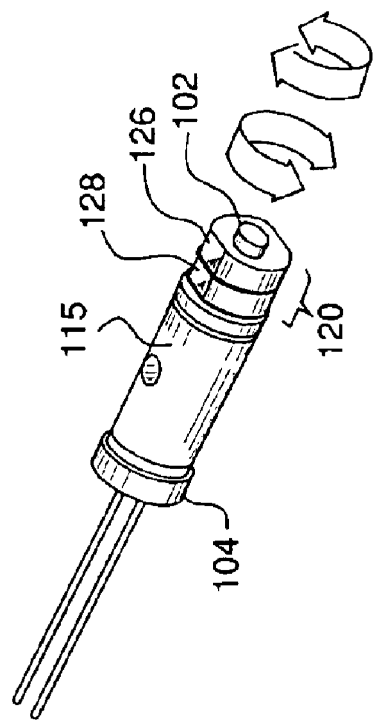
FIGS. 2A and 2B are perspective views of a preferred embodiment of a fiber optic module according to the invention.
Figure 2A:
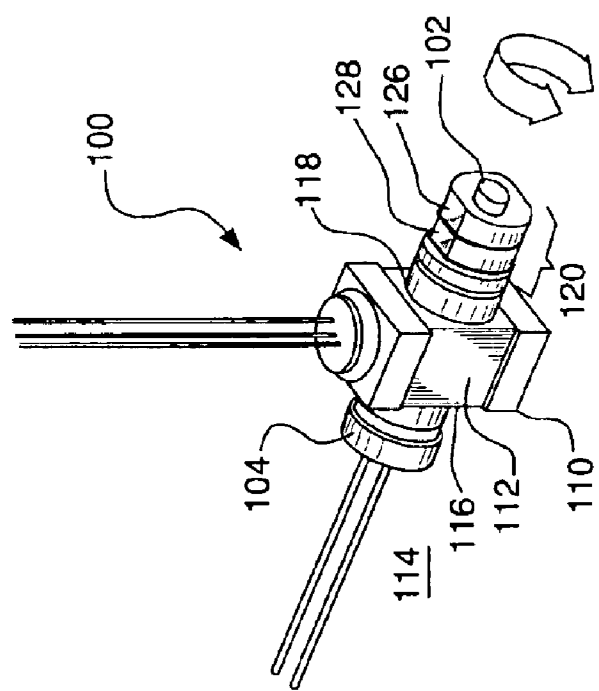
Figure 3:
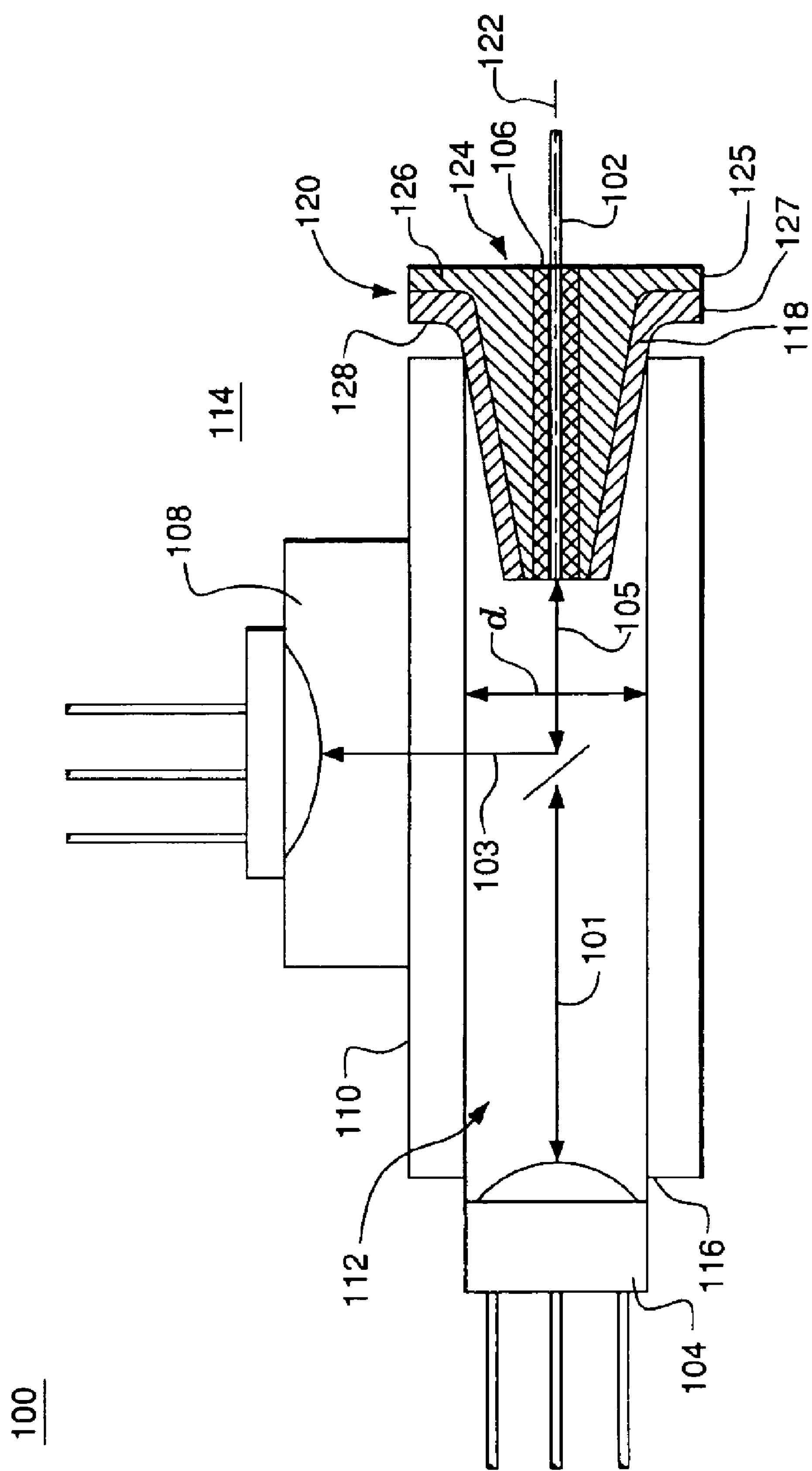
FIG. 3 is a cross-sectional view of a preferred embodiment of a fiber optic module according to the invention.

FIGS. 2A and 2B are perspective views, and FIG. 3 is a cross-sectional view, of a preferred embodiment of a fiber optic module 100 according to the invention. As shown, module 100 includes a housing 110 that defines an interior region 112 and an exterior region 114 of the module 100. The housing 110 has a first, or target, receiving aperture 116 and a second, or fiber, receiving aperture 118. Each aperture 116, 118 extends from the exterior region 114 to the interior region 112 of the module 100. Preferably, the housing is made of metal, though it can be made of any suitable material.

According to the invention, a positioning device 120 is attached to the housing 110 and extends at least partially into the interior region 112 of the module 100 through the fiber receiving aperture 118. Preferably, as will be described in detail below, the positioning device 120 is attached to the housing 110 by laser welding. In a preferred embodiment as shown, the positioning device 120 and a target 104 are attached to a guide channel 115, which can also be referred to as a z-coupler. The guide channel 115 is attached to the housing 110.

As shown in FIG. 3, the positioning device 120 also has a bore 124 that extends through at least a portion of the positioning device 120. The bore 124 has a bore axis that is eccentric relative to the central axis 122 of the positioning device 120. That is, the bore 124 has a bore axis that is displaced from the central axis 122. The central axis 122 is the axis of revolution of the positioning device 120.

The module also includes an optical fiber 102 that extends at least partially through the bore 124. The optical fiber 102 is fixedly coupled to the positioning device 120. For example, in a preferred embodiment, the optical fiber 102 can be secured to a ferrule 106 via epoxy or other such adhesive. Preferably, the ferrule 106 extends at least partially through the bore 124 of the positioning device, and is fixedly coupled thereto. The optical fiber 102 extends at least partially through an interior portion of the ferrule 106 and is fixedly coupled thereto. The ferrule 106 is affixed to the positioning device 120, preferably by laser welding. The positioning device 120 is affixed to the housing, preferably by laser welding.

According to the invention, the positioning device is sized and shaped such that when the positioning device is inserted into the housing, the positioning device abuts against the housing. For example, positioning device 120 has an outer diameter that is substantially equal to the diameter, d, of the fiber receiving aperture 118. Preferably, the positioning device 120 is tapered so that it can be inserted into the housing 110 until it fits snugly against the perimeter of the fiber receiving aperture 118.

Preferably, the positioning device 120 includes an inner positioning member 126 and an outer positioning member 128. Each of the positioning members includes a respective knob end 125, 127 via which a user of the device can cause the positioning members 126, 128 to rotate about the central axis 122. The structure and function of the positioning members 126, 128 are described in greater detail below.

Preferably, the module 100 includes a light source 104 that is attached to the housing 110 and extends at least partially into the interior region 112 of the module 100 through the source receiving aperture 116. The light source 104 emits a beam of radiation 101, and is aligned with the optical fiber 102 such that the optical fiber 102 receives the emitted beam. Preferably, the light source 104 comprises a laser diode.

The package can also include an optical receiver 108. The beam of radiation 105 from the fiber 102 can be directed to a splitter 107 that splits the beam 105 into two beams 101 and 103. Beam 103 is directed to the optical receiver 108.

FIGS. 4A–4D are axial cross-sections of preferred embodiments of a positioning device 120 according to the invention. As shown in FIGS. 4A–4D, a positioning device 120 according to the invention has a central axis 122 extending along a length, l, thereof. The central axis 122 is the axis of rotation of the positioning device 120.

Preferably, the positioning device includes a first (or outer) positioning member 132 and a second (or inner) positioning member 136. The outer positioning member 132 has a bore 134 extending through at least a portion thereof. The bore 134 has a bore axis 135 that is eccentric relative to the central axis 122 of the positioning device 120. That is, the bore axis 135 is displaced from the central axis 122 by a distance, $\delta$. Since the central axis 122 is the axis of rotation of the positioning device 120 (and of the outer positioning member 132), rotation of the positioning device 120 (or of the outer positioning member 132) imparts a reciprocating motion to the bore 134 relative to the central axis. That is, the bore axis 135 revolves around the central axis 122 as the positioning member 120 (or outer positioning member 132) is turned. Preferably, the bore 134 has a generally circular cross-section perpendicular to the central axis 122 (see FIGS. 5A–5C).

The inner positioning member 136 is disposed at least partially within the bore 134 of the outer positioning member 132. Preferably, the inner positioning member 136 has a generally circular cross-section perpendicular to the central axis 122. The cross-section of the inner positioning member 136 has an outer diameter, $d_1$, that is substantially equal to the bore diameter, $d_o$, of the outer positioning member 132. In this way, the inner positioning member 136 can be inserted into the outer positioning member 132 until it fits snugly against the interior surface of the outer positioning member 132, thereby minimizing any gap that might exist between the positioning members 132, 136. The smaller the gap between the positioning members 132, 136, the less movement of the fiber optic cable is likely to occur during the welding process.

The inner positioning member 136 and the outer positioning member 132 are independently free to rotate. That is, the inner positioning member 136 can be rotated about its axis of revolution (which, in a preferred embodiment, is the same as the bore axis 135 of the outer positioning member 132), without causing the outer positioning member 132 to move. Likewise, the outer positioning member 132 can be rotated about its axis of revolution 122 (which is the central axis), without causing the inner positioning member 136 to move. The inner positioning member 136 has a bore 138. The bore 138 has a bore axis 137. Though it appears from FIG. 4A that the bore axis 137 is colinear with the central axis 122, the bore axis 137 is actually displaced from the central axis 122 by a distance, $\delta_i$ (see FIGS. 5A–5C). As the inner positioning member 136 is rotated, the bore axis 137 revolves around the central axis 122.

Figure 4A:
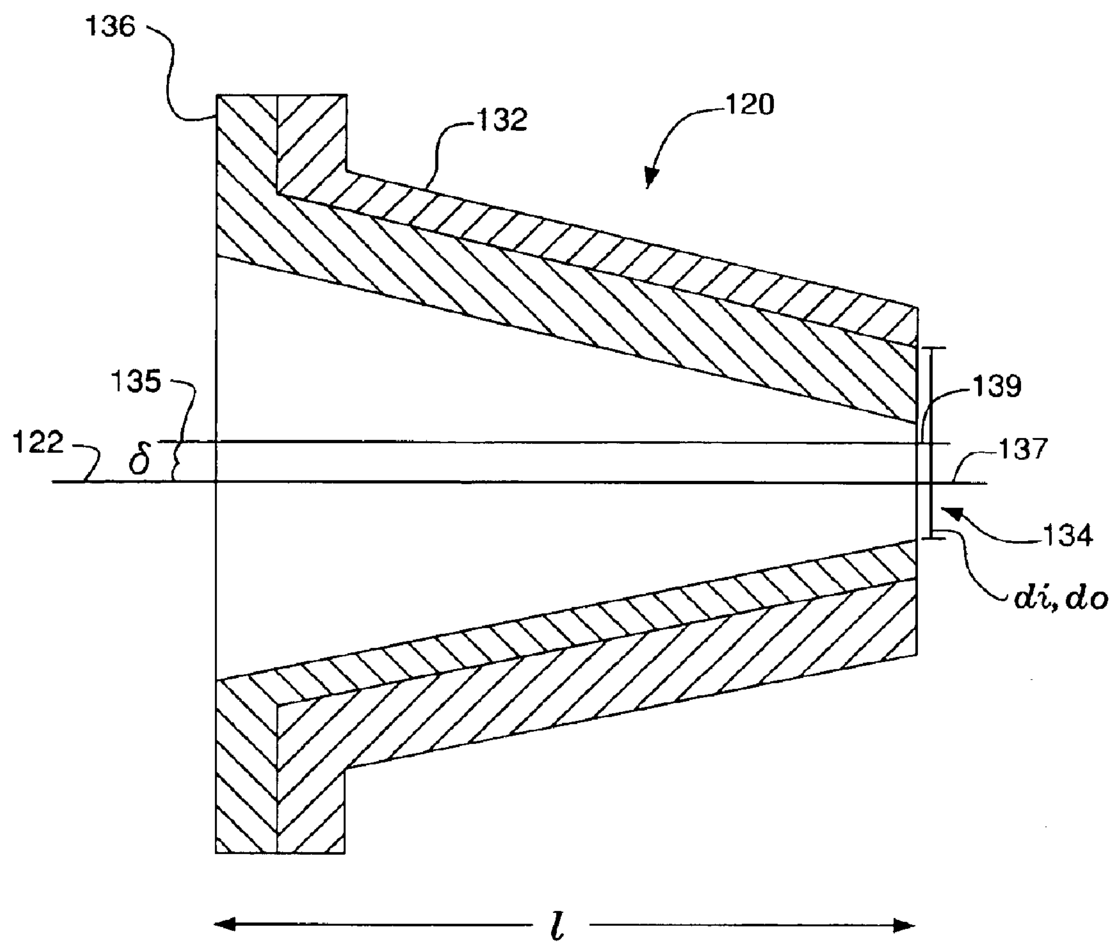
FIGS. 4A–4D are axial cross-sections of preferred embodiments of positioning devices according to the invention.
Figure 4B:
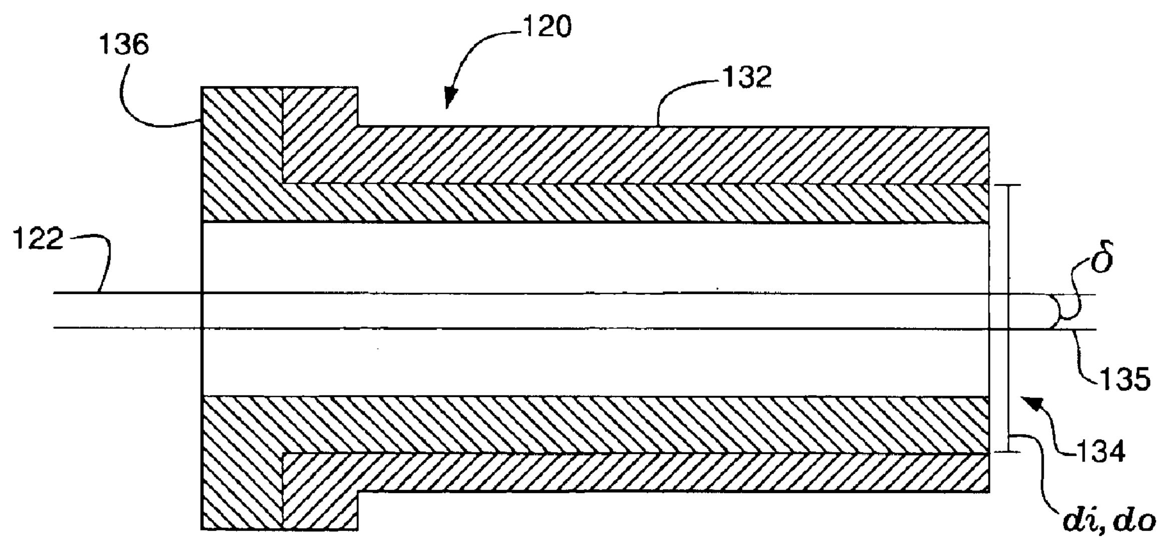
Figure 4C:
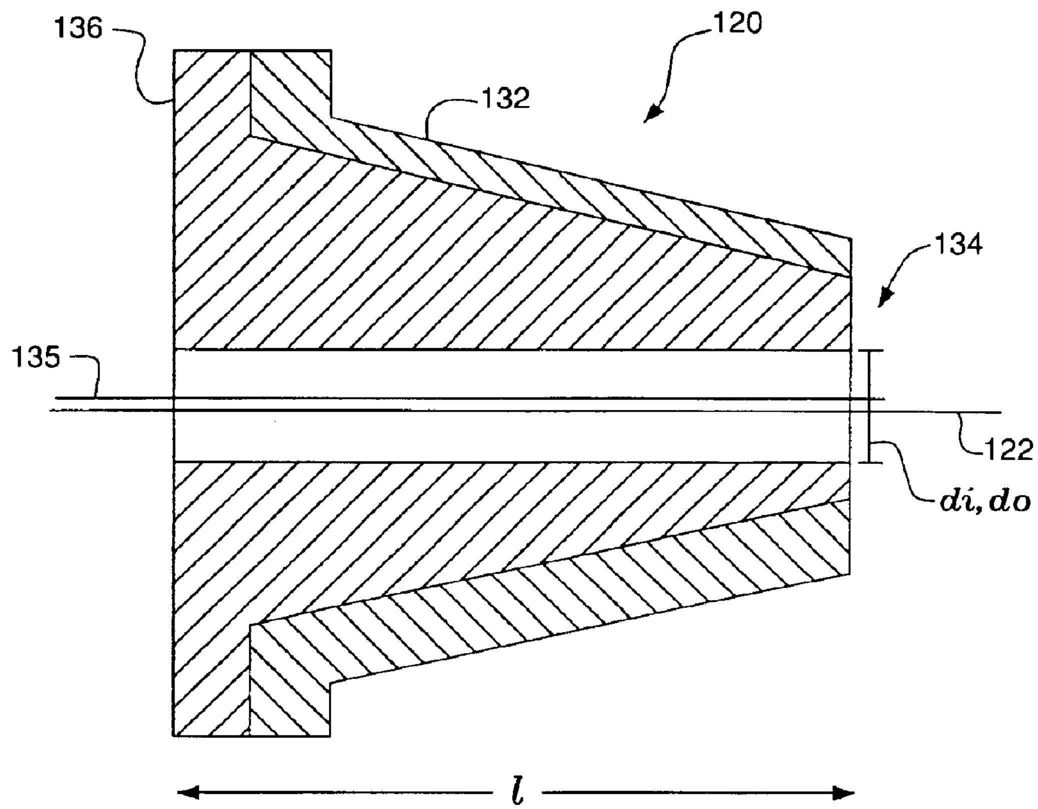
Figure 4D:
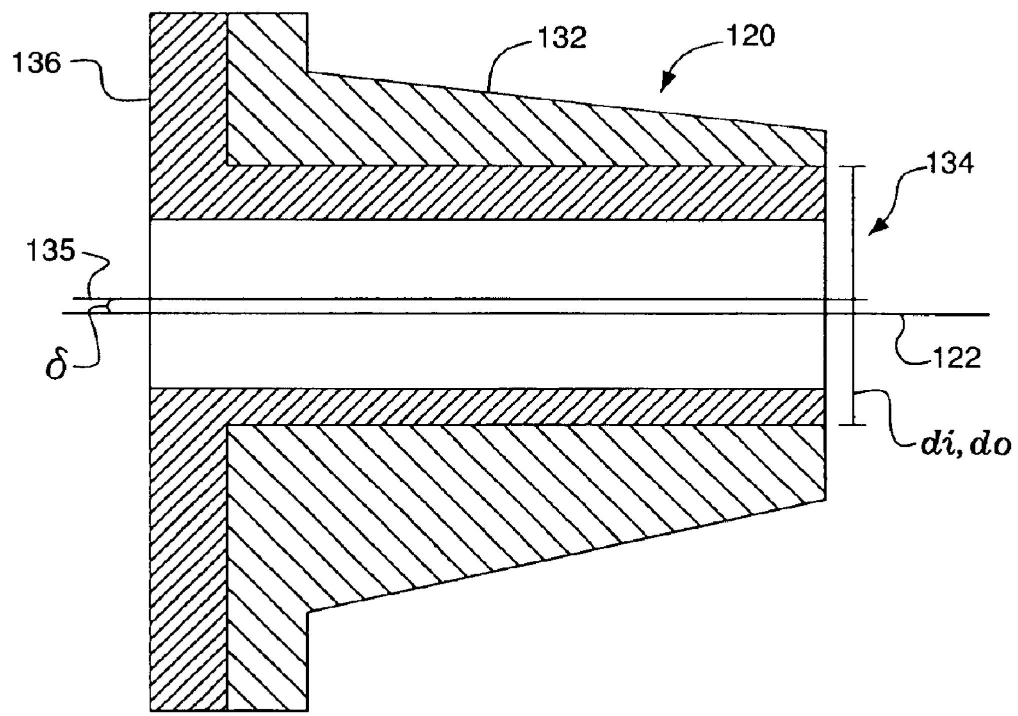

Depending on the application, the overall shape of the positioning members can vary. As shown in FIG. 4A, each of the inner positioning member 136 and the outer positioning member 132 can have a generally frusto-conical overall shape, with a generally frusto-conical bore. This embodiment is particularly suitable for the alignment of an optical fiber with a light source in a fiber optic module as described above. As shown in FIG. 4B, each of the inner positioning member 136 and the outer positioning member 132 can have a generally cylindrical overall shape, with a generally cylindrically shaped bore. As shown in FIG. 4C, the inner positioning member 136 can have a generally frusto-conical overall shape, with a generally cylindrical bore, and the outer positioning member 132 can have a generally frusto-conical overall shape with a generally frusto-conical bore. As shown in FIG. 4D, the inner positioning member 132 can have an overall shape that is generally that of a hollow cylinder, and the outer positioning member 136 can have a generally frusto-conical shape, with a generally cylindrical bore. In any event, the positioning members 132, 136 are sized and shaped so as to minimize any gaps that might exist between the housing 110 and the optical fiber 102 during assembly of the module 100. This ensures that the optical fiber 102 will not move out of alignment with the target 104 during the laser welding process.

Figures 5A, 5B, 5C:
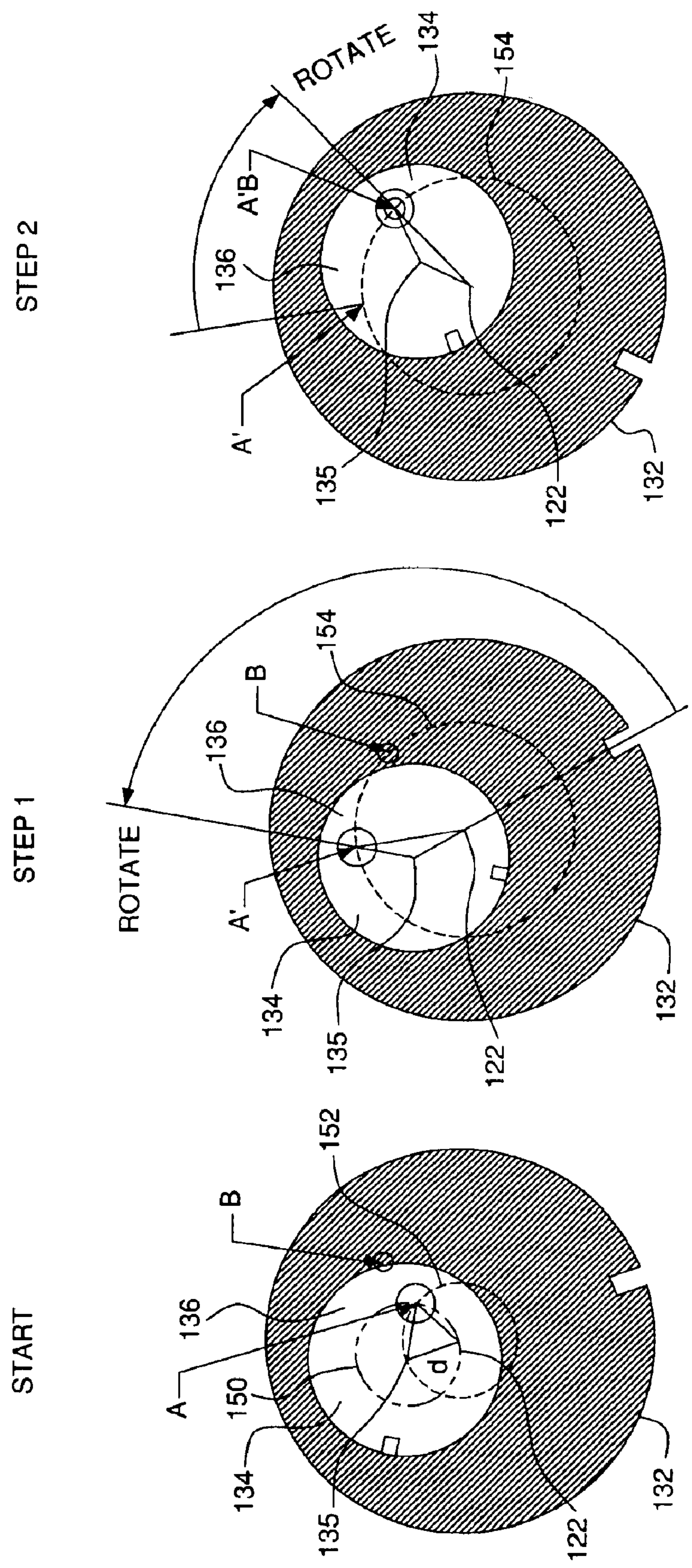
FIGS. 5A–5C are transverse cross-sections of a preferred embodiment of a positioning device according to the invention at various stages of rotation.

FIGS. 5A–5C are transverse cross-sections of a preferred embodiment of a positioning device according to the invention. In such an embodiment, the outer positioning member 132 has an eccentrically disposed bore 134. That is, the bore 134 has a bore axis 135 that is displaced from the axis of revolution of the outer positioning member 132 by a distance, d. The central axis 122 of the outer positioning member 132 is the axis of revolution of the outer positioning member 132 and of the positioning device 120.

Preferably, the bore 134 has a generally circular cross-section perpendicular to the bore axis 135. The cross-section of the bore has a bore diameter, $d_o$. Thus, as the outer positioning member rotates about the central axis, the bore revolves around the central axis, forming an annulus (or circle) having its center at the central axis. It should be understood that the size and shape of the bore can be selected to generate an annulus or circle of any desired size and shape.

Point A is an alignment point on the cross section of the inner positioning member 136. Point B is a target alignment point, that is, the point to which point A should be moved. In accordance with the invention, the positioning device can be used to align (or co-locate) point A with point B. Specifically, the positioning members can be rotated independently of one another until alignment point A is aligned with alignment point B. In an exemplary application, such as the fiber optic module described above, point A is a point on the cross-section of the fiber optic cable. Point B is a point on the cross-section of the emitted light beam. The fiber optic cable is properly aligned with the light source when point A is aligned with point B. That is, the optical power through the cable is maximal when point A on the cable is aligned with point B on the light beam.

As shown in FIG. 5A, point A is located initially on a path 150 formed around the axis of revolution of the inner positioning member 132. Point A is also located initially on a first path 152 formed around the axis of revolution of the outer positioning member 136. As shown in FIGS. 5B and 5C, point B is located on a second path 154 formed around the axis of revolution of the outer positioning member.

In accordance with the invention, the inner positioning member 136 can be rotated from a first angular position, as shown in FIG. 5A, to a second angular position, as shown in FIG. 5B. That is, the alignment point A can be moved along the path 150 around the axis of revolution of the inner positioning member 136 until point A lies on the path 154 around the axis of revolution of the outer positioning member 132 on which point B lies. Thus, the inner positioning member 136 can be rotated until point A is located at a point where the path 150 and the path intersect 154.

Similarly, the outer positioning member 132 can be rotated from a first angular position, as shown in FIG. 5B, to a second angular position, as shown in FIG. 5C. That is, the alignment point A can be moved along the path 154 around the axis of revolution of the outer positioning member 132 on which point B lies until the alignment point A is aligned with the alignment point B. Thus, any alignment point on the cross-section of the inner positioning member 136 can be aligned with any point on the area formed by the revolution of the inner positioning member 136 around the central axis 122 of the positioning device 120.

Figure 6A:
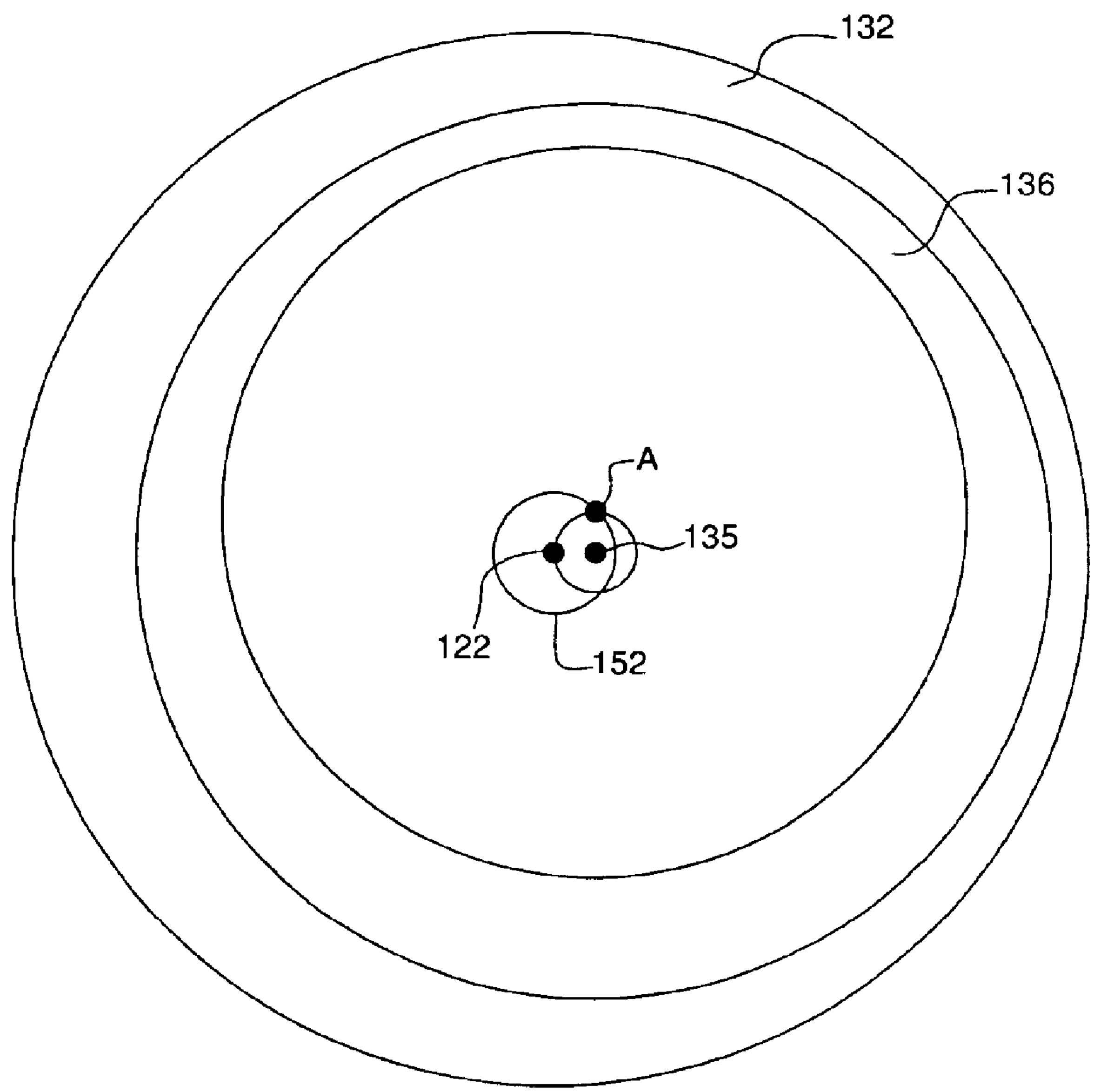
FIGS. 6A–6C are transverse cross-sections of another embodiment of a positioning device according to the invention at various stages of rotation.
Figure 6B:
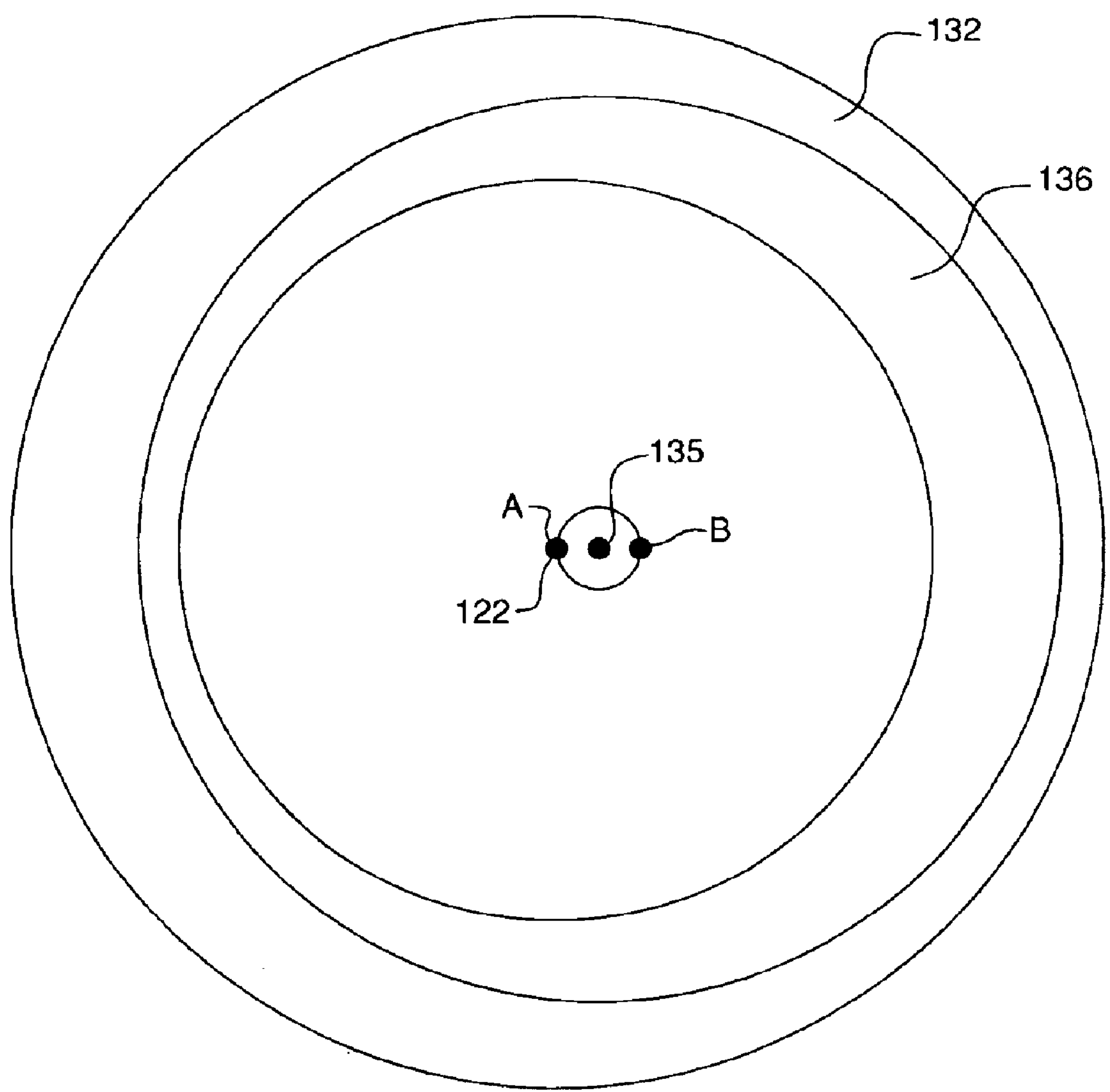
Figure 6C:
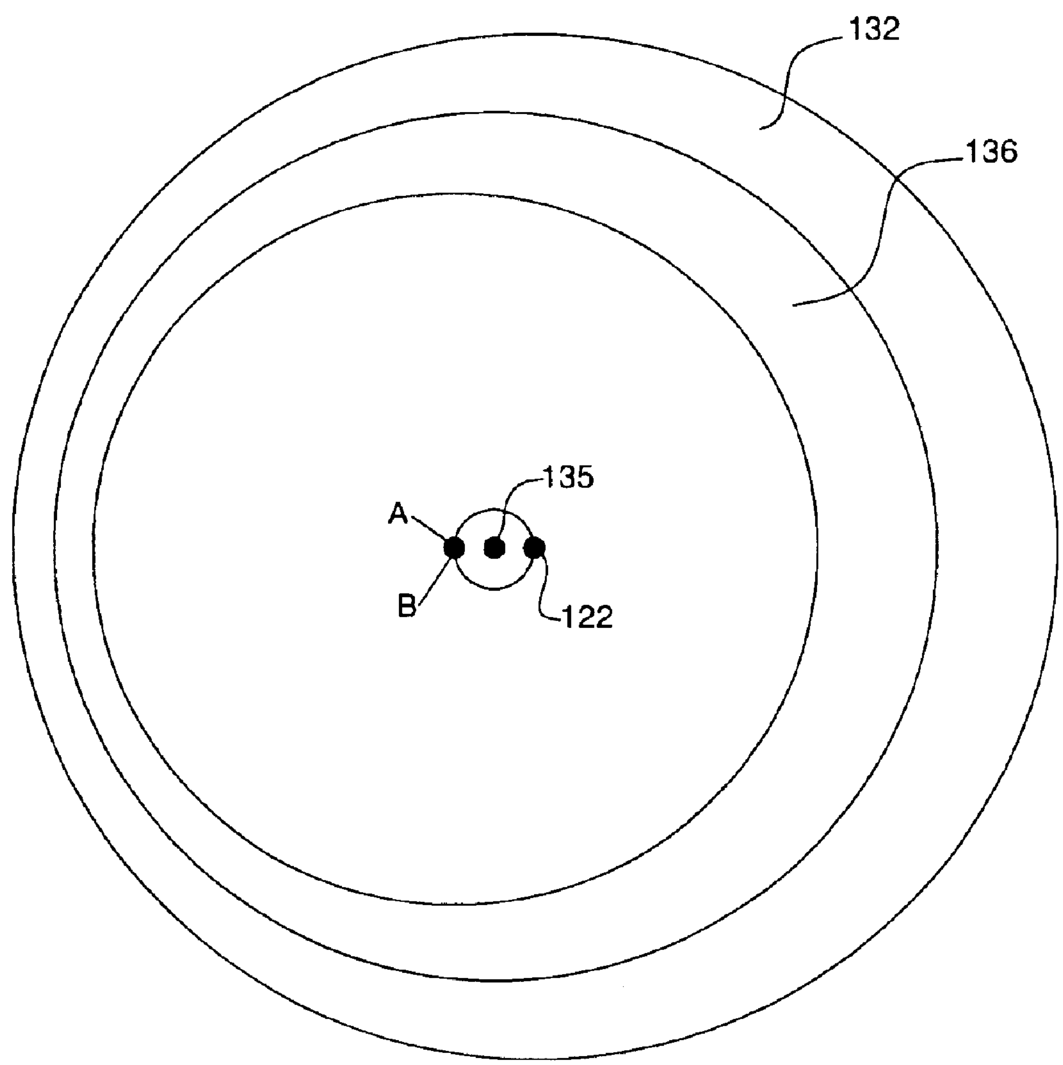

FIGS. 6A–6C are transverse cross-sections of a preferred embodiment of a positioning device 120 according to the invention that is particularly suitable for use in aligning a fiber optic cable with a light source such as a laser diode during the manufacture of a fiber optic module as described above. FIGS. 6A–6C depict the positioning device 120 at various stages of rotation of both the outer positioning member 132 and the inner positioning member 136.

The inner positioning member 136 has a cross-section that is suitable for the fiber optic cable and its complementary ferrule. To properly align the cable with light source, the cable is moved until the maximum power through the cable is achieved (i.e., until the cable receives the most intense light from the light source). Accordingly, the alignment point A is at the center axis of the cable, which, as shown, can be the center axis 137 of the inner positioning member 136. The target point (i.e., the point to which the alignment point A is to be moved for maximum power through the cable) is designated as point B. As described with respect to FIGS. 5A–5C, point A is located initially on a path formed around the axis of revolution of the inner positioning member, as well as on a first path formed around the axis of revolution of the outer positioning member. Point B is located initially on a second path formed around the axis of revolution of the outer positioning member.

As shown in FIGS. 6A–6C, each of the positioning members 132, 136 has a respective eccentrically disposed bore 134, 138. Positioning of the bore 138 relative to the axis of revolution of the inner positioning member dictates the area that can be generated as the inner positioning member is rotated around its axis of revolution. Similarly, positioning of the bore 138 relative to the axis of revolution of the outer positioning member (and thus, of the positioning device) dictates the area that can be generated as the outer positioning member is rotated around its axis of revolution.

In similar fashion to the process described above in connection with FIGS. 5A–5C, the inner positioning member 136 can be rotated from a first angular position, as shown in FIG. 6A, to a second angular position, as shown in FIG. 6B. That is, the alignment point A can be moved along the path around the axis of revolution of the inner positioning member until point A lies on the path around the axis of revolution of the outer positioning member on which point B lies. Thus, the inner positioning member can be rotated until point A is located at a point where the path and the path intersect.

Similarly, the outer positioning member can be rotated from a first angular position, as shown in FIG. 6B, to a second angular position, as shown in FIG. 6C. That is, the alignment point A can be moved along the path around the axis of revolution of the outer positioning member on which point B lies until the alignment point A is aligned with the alignment point B.

Figure 7A:
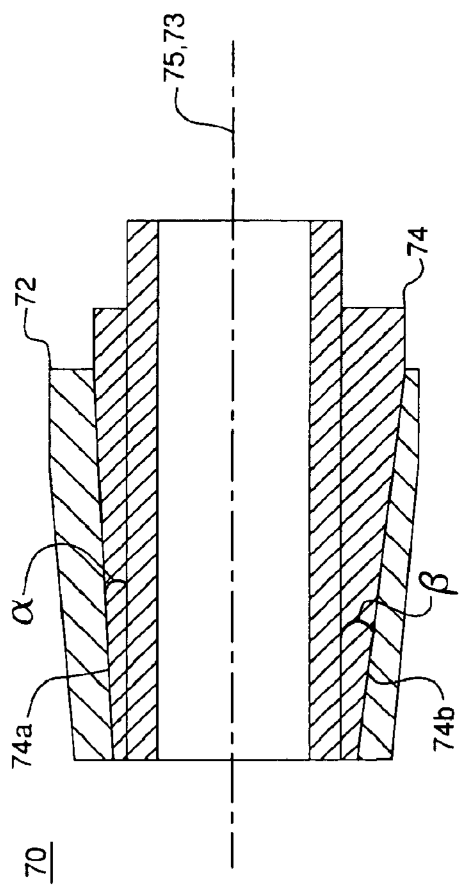
FIGS. 7A–7D are axial cross-sections of other preferred embodiments of a positioning device according to the invention at various stages of rotation.
Figure 7B:
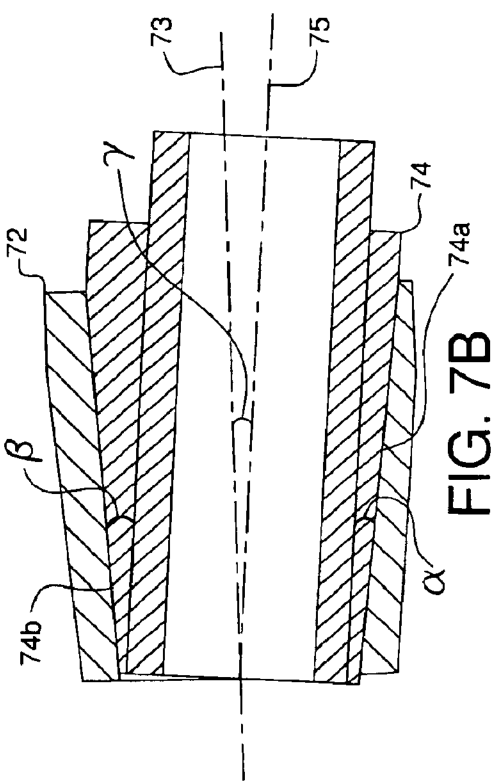

FIGS. 7A and 7B are axial cross-sections of another preferred embodiment of a positioning device 70 according to the invention at various stages of rotation. As shown, the positioning device 70 includes an outer positioning member 72, having an axis of rotation 73, and an inner positioning member 74, having an axis of rotation 75. According to the invention, the inner positioning member 74 is formed so that its axis of rotation 75 is at an angle γ with the axis of rotation 73 of the outer positioning member 72. That is, the axis of rotation of the inner positioning member rotates about the axis of rotation of the outer positioning member in a conical fashion.

As the inner positioning member 74 rotates, its axis of rotation 75 oscillates between ±γ. Preferably, γ is approximately 4°. The inner surface of the outer positioning member 72 and the outer surface of the inner positioning member 74 are formed such that a first edge 74*a* is at a first angle, α, with the axis 75 and a second edge 74*b* is at a second angle, β, with the axis 75. Preferably, β is approximately 7° and α is approximately 3°. Thus, the axis of rotation 75 of the inner positioning member 74 can be rotated $\pm\gamma=\pm(\beta-\alpha)=\pm4°$ with respect to the axis of rotation of the outer positioning member.

Figure 7C:
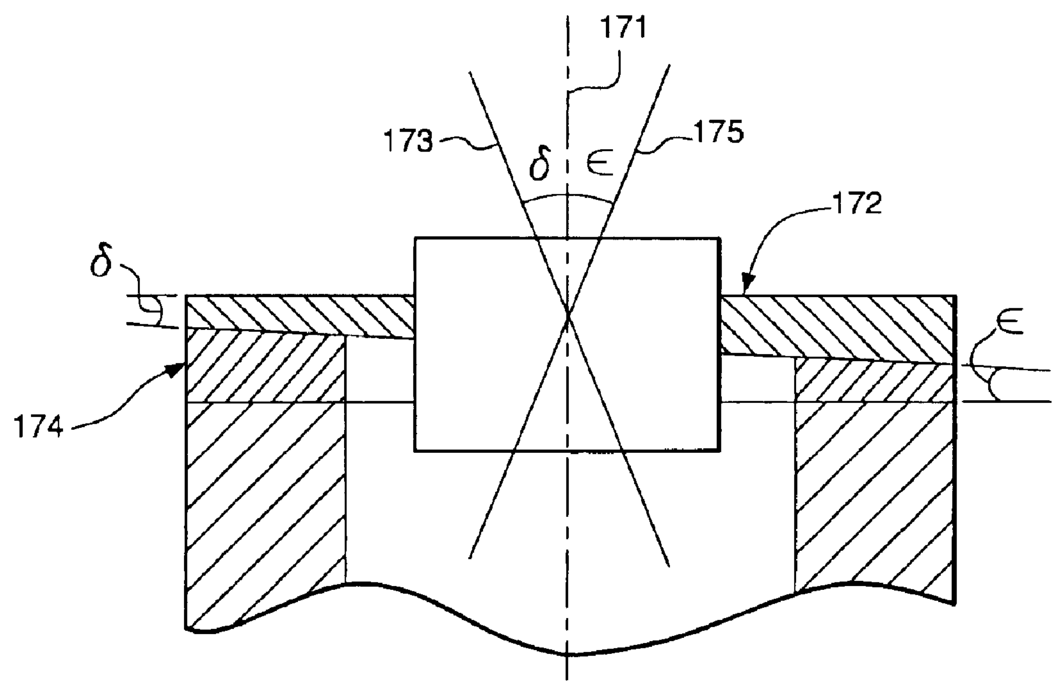
Figure 7D:
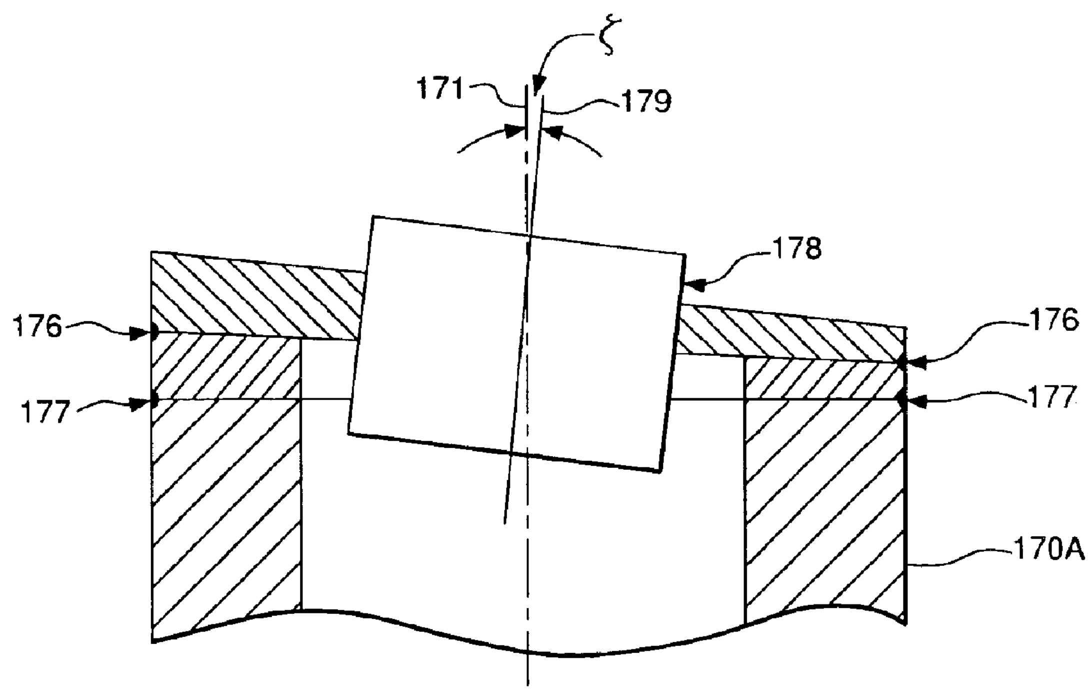

FIGS. 7C and 7D are axial cross-sections of another preferred embodiment of a positioning device 170 according to the invention at various stages of rotation. As shown, the positioning device 170 has a central axis 171, and includes a first positioning member 172 and a second positioning member 174 disposed along the central axis 171 of the device. As shown, each of the positioning members 172 and 174 has a generally wedge-shaped cross-section transverse to the central axis 171. In general, the first positioning member 172 has a wedge-shaped cross-section of angle $\delta$ and, therefore, a longitudinal axis 173 that forms an angle $\delta$ with the central axis 171. Similarly, the second positioning member 174 has a wedge-shaped cross-section of angle $\epsilon$ and, therefore, a longitudinal axis 175 that forms an angle $\epsilon$ with the central axis 171.

As the positioning members are rotated relative to one another about the central axis 171, the axis 179 of the aligned part 178 oscillates about the central axis. Thus, the axis 179 of the aligned part 178 can be positioned relative to the central axis at any angle from $\zeta=\delta-\epsilon$ to $\zeta=\delta+\epsilon$. Preferably, $\delta=\epsilon$ so that the positioning members 172, 174 can be rotated to align the axis 179 of the aligned part 178 with the central axis 171 of the device 170. As shown in FIG. 7D, the first positioning member can be welded at weld spots 176 to the second positioning member, which can be welded to the housing 170A of the device 170 at weld spots 177.

The embodiments shown in FIGS. 7A–D are particularly suitable for applications that are less sensitive to variations in the x-y plane or distance along the z-axis, but where it is much more desirable for straightness. For example, such an application can include a package wherein it is desirable to align an optical fiber collimator with a collimated beam, for example. Such a package can tolerate slight variations in the x-y plane or along the z-axis, but, for reasons that should be understood to those or skill in the art, it is desirable for the fiber collimator to be as straight as possible with respect to the collimated beam.

Figure 8:
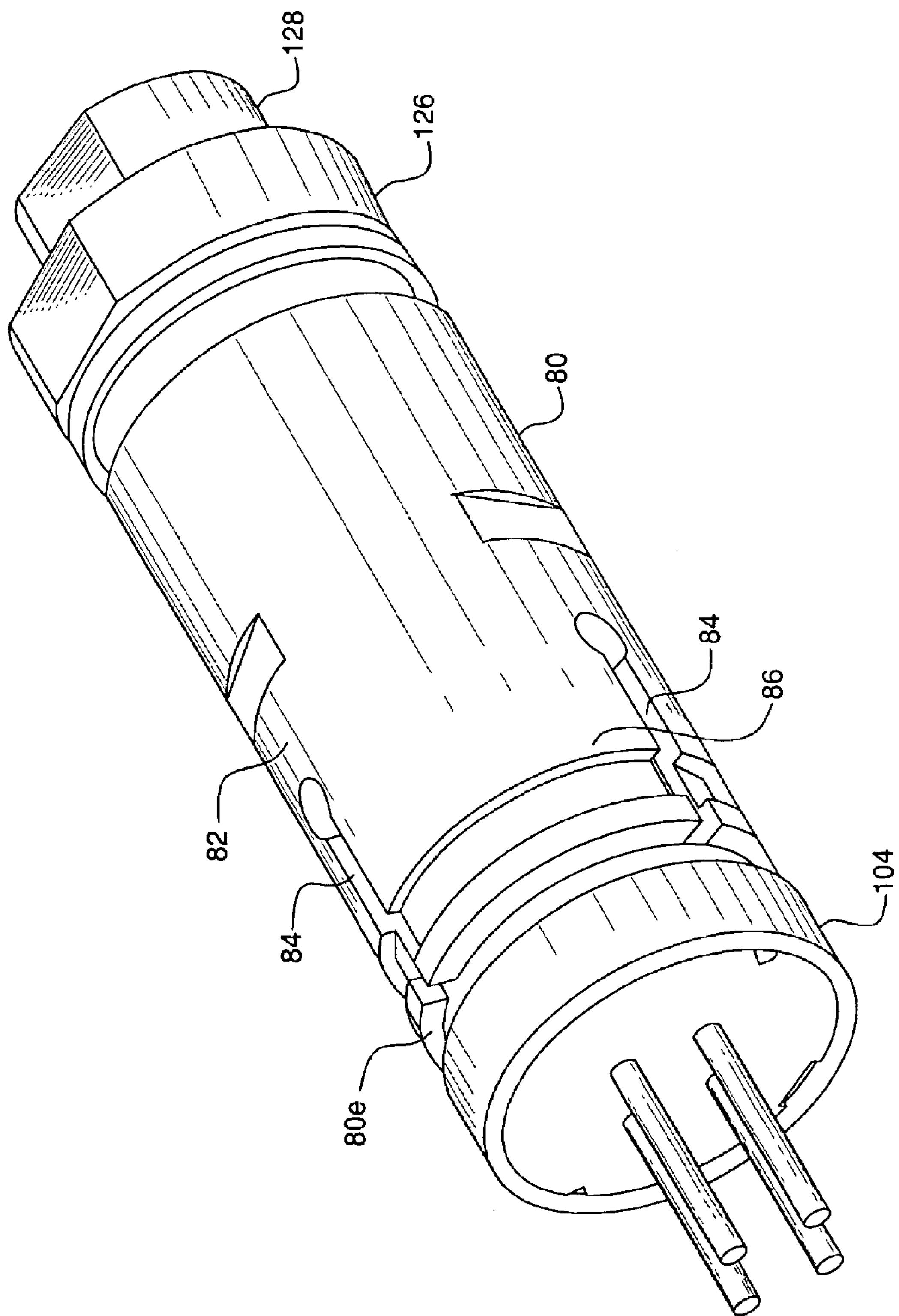
FIG. 8 is a perspective view of a preferred embodiment of a z-coupler according to the invention for a fiber optic module.

FIG. 8 is a perspective view of a preferred embodiment of a fiber optic module 100 comprising a z-coupler 80 according to the invention. As shown, the z-coupler 80 comprises a z-coupler body 82 having one or more grooves 84 that extend into the body 82 of the z-coupler 80 from an end 80*e* thereof. The grooves 84 permit the end 80*e* of the z-coupler to expand and contract radially outward from its axis 80*a*. That is, the wings 86 that are formed between the grooves 84 at the end 80*e* of the z-coupler 80 are resilient. This is desirable so that when a target 104, such as a laser diode, as shown in FIG. 8, or an optical receiver, or another optical fiber, is inserted into the z-coupler 80, the end 80*e* of the z-coupler 80 confines the target 104 in all directions.

Preferably, the diameter of the end 80*e* of the z-coupler 80 is made slightly smaller than the diameter of the portion of the target 104 that is to be inserted into the z-coupler 80. Consequently, as the target 104 is inserted into the z-coupler 80, the end 80*e* is forced open slightly, and exerts a counterforce on the target 104, thereby holding the target in place. The target 104 is thus confined in the z-direction, and well as in the x-y plane, further reducing the possibility that the target 104 and the optical fiber (not shown in FIG. 8) will come out of alignment during the laser welding process. Preferably, the z-coupler is made of metal, though it can be made of any suitable material.

Figure 9:
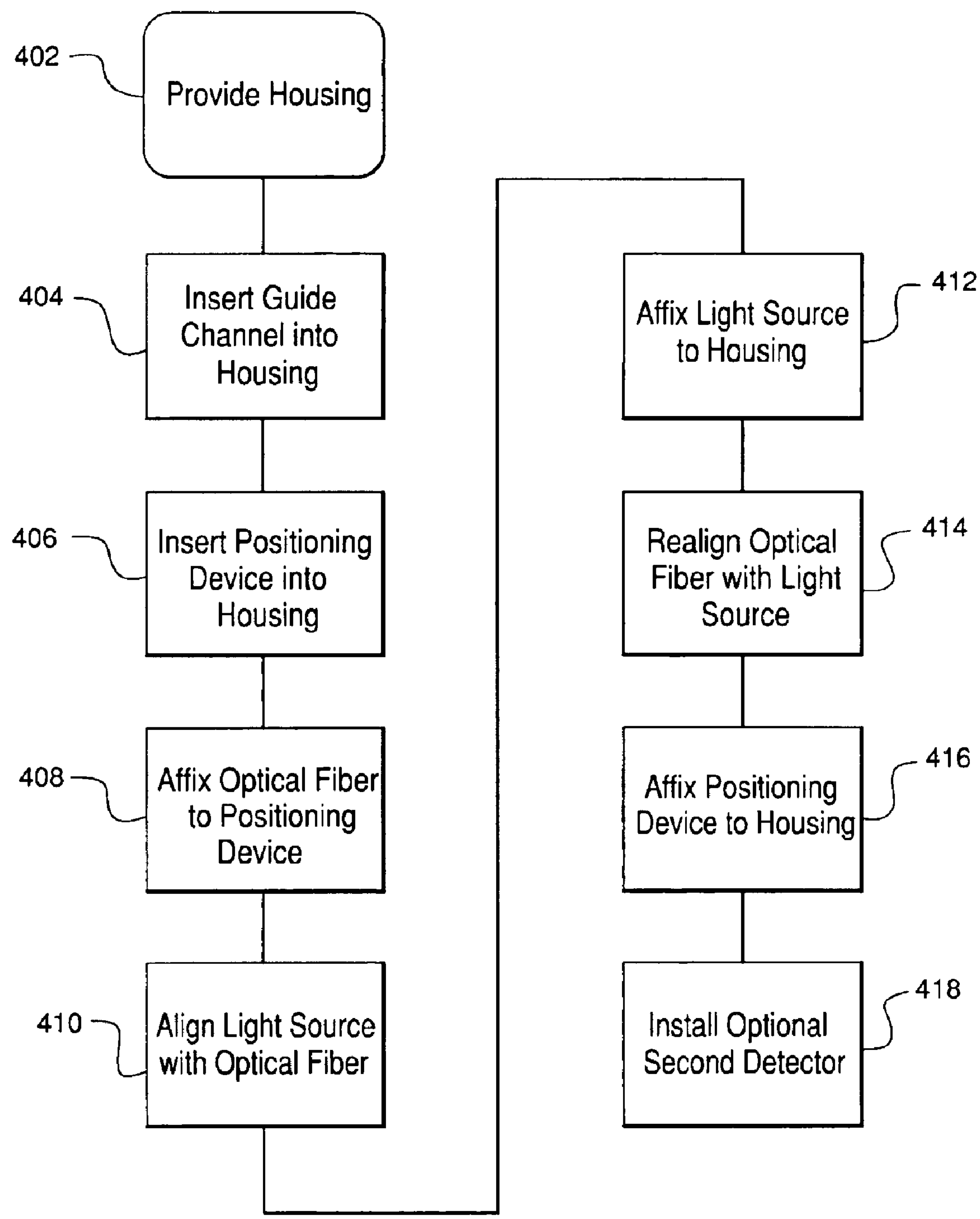
FIG. 9 is a flowchart of a method for aligning an optical fiber and laser welding a fiber optic module using a positioning device according to the invention.

FIG. 9 is a flowchart of a method 400 for aligning an optical fiber and laser welding a fiber optic module using a positioning device according to the invention. At step 402, a module housing is provided. The housing, as described in detail above, has a target receiving aperture and a fiber receiving aperture. At step 404, a guide channel (or "z-coupler") is inserted through, and affixed to, the housing. The guide channel extends from the target receiving aperture to the fiber receiving aperture. Preferably the guide channel is generally cylindrical in shape, and is affixed to the housing by epoxy or laser welding.

At step 406, a positioning device is inserted into the guide channel such that the positioning device extends at least partially into the interior region of the module through the fiber receiving aperture. As described in detail above, the positioning device has a central axis, and an outer diameter that is substantially equal to the diameter of the fiber receiving aperture. The positioning device has at least one eccentrically disposed bore extending through at least a portion thereof. That is, the bore has a bore axis that is displaced relative to the central axis.

In accordance with the invention, the positioning device can be shaped to minimize any gaps that might exist between the ferrule and the inner positioning member, between the inner positioning member and the outer positioning member, and between the outer positioning member an the housing. In this way, when the positioning member is laser welded to the housing, the laser welding forces will not cause the optical fiber to move out of alignment with the light source.

At step 408, an optical fiber is fixedly coupled to the positioning device, such that the optical fiber extends at least partially through the bore. Preferably, the optical fiber is affixed to a ferrule. The ferrule is affixed to the positioning device. Preferably, the ferrule is epoxied or laser-welded to an interior surface of the positioning device. More preferably, the ferrule is laser-welded to an interior surface of the inner positioning member.

At step 410, a target is aligned with the optical fiber. The target, which can be a light source, such as a laser diode, a light receptor, such as an optical receiver, another optical fiber, or the like, is inserted into the guide channel through the target receiving aperture. Thus, the target extends at least partially into the interior region of the module through the target receiving aperture. The target is moved along the guide channel axis until it is disposed in its proper position. The proper position of the target along the guide channel axis can be determined, for example, by determining the relative positions of the optical fiber and the target that result in the maximum intensity of light received by the optical fiber.

Once the target is moved into position along the guide channel axis, the target is affixed to the housing at step 412. Preferably, the target is attached to the housing by laser welding.

At step 414, the optical fiber is realigned with the target. Presumably, though not necessarily, the optical fiber may have moved out of alignment with the target as a result of the process of affixing the target to the housing. As described above, laser welding techniques, for example, generate forces on the module that can cause the target and fiber to move out of alignment with one another. Accordingly, the positioning members are rotated relative to one another until the optical fiber is realigned with the target.

At step 416, the optical fiber is affixed to the housing. Preferably, the optical fiber is epoxied to the ferrule before alignment. A laser weld machine can then be used to weld the positioning device to the housing.

Figure 10:
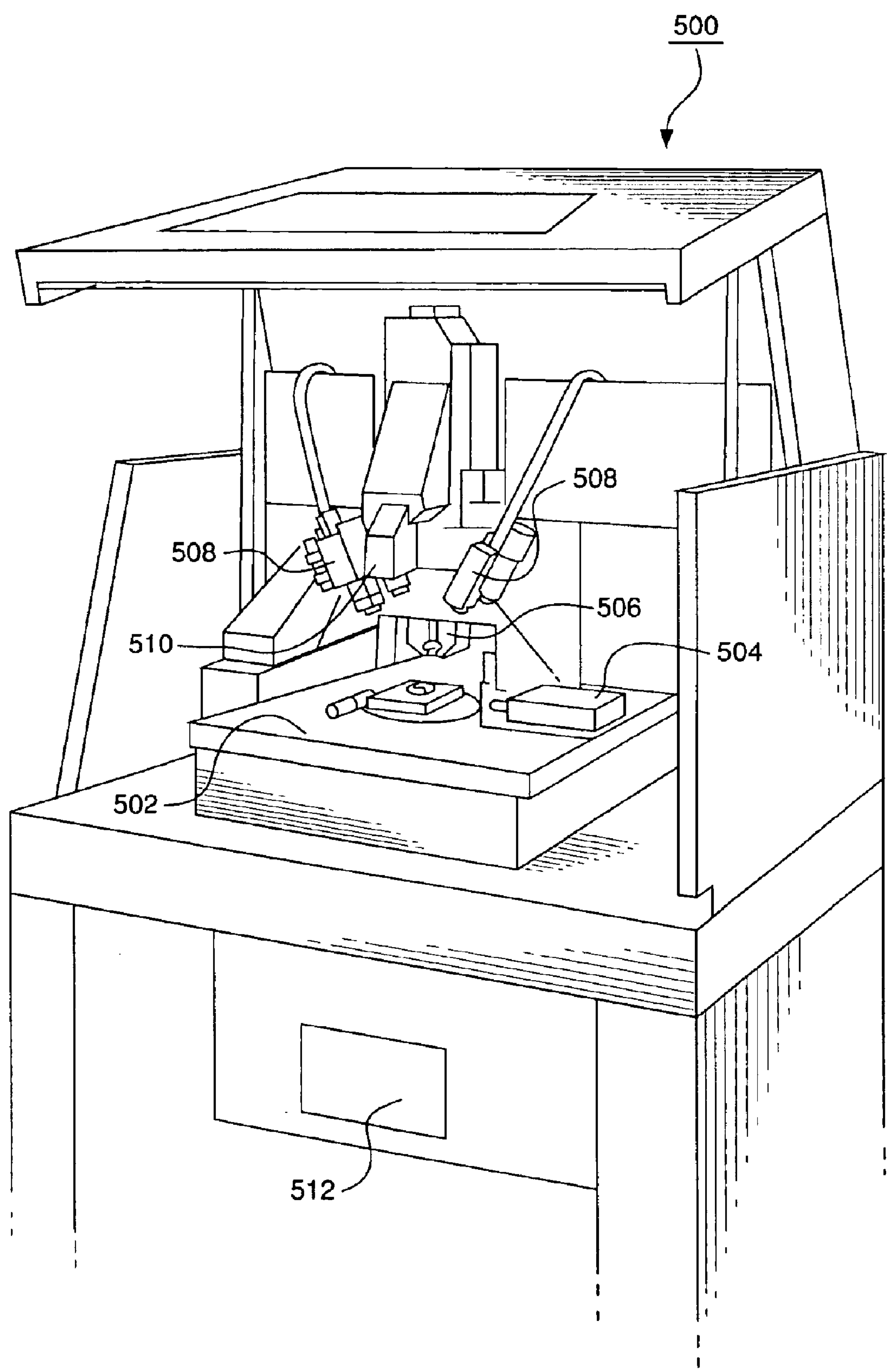
FIG. 10 is a perspective view of a laser weld machine that can be used to laser weld a fiber optic module according to the invention.

FIG. 10 is a perspective view showing a laser weld machine 500 that can be used to laser weld a fiber optic module according to the invention. The machine 500 can include a table 502 to support a fiber module during assembly. The table 502 can be an x-y table that can move the module within a spatial plane. The machine 500 can further include an automated fiber loader 504 that can insert the fiber through the snout of the package housing and an articulate gripper 506 that can grasp and move the ferrule within the package housing. The machine 500 may also have a vacuum pencil (not shown) that loads a clip into the module.

The machine 500 can have a pair of laser welding units 508, each of which emits a beam of light to laser weld the module. Cameras 510 can be mounted to the lasers 508 and connected to a monitor (not shown) to allow an operator to view the laser welding sites.

The machine 500 can have a tester unit (not shown) that is used to align the fiber to the laser diode. The tester unit can include a driver circuit that excites the laser diode within the module to emit a light beam that is transmitted through the fiber optic cable. The tester unit can also have a detector that can detect the light transmitted through the fiber cable.

The gripper 506, lasers 508 and tester unit can be connected to a computer 512. The computer 512 can execute a software routine that assists the operator in aligning the fiber optic cable with the laser diode by providing a display, for example, that indicates to the operator the current intensity of the received light. The operator can then adjust the positioning device to maximize the intensity, thereby aligning the optical fiber with the light source.

Thus, there have been described apparatus and methods for micro-positioning and alignment that are particularly suitable for optical fiber modules. Those skilled in the art will appreciate that numerous changes and modifications can be made to the preferred embodiments of the invention, and that such changes and modifications can be made without departing from the spirit of the invention. It is intended, therefore, that the appended claims cover all such equivalent variations as fall within the true spirit and scope of the invention.

We claim:

1. A fiber optic module, comprising:

a housing that defines interior and exterior regions of the fiber optic module, the housing having a target receiving aperture and a fiber receiving aperture, the fiber receiving aperture having a diameter;

a positioning device that is attached to the housing and extends at least partially into the interior region of the module through the fiber receiving aperture, the positioning device having a central axis and comprising:

an outer positioning member having an outer diameter that is approximately equal to the diameter of the fiber receiving aperture at a point where the positioning device is welded to the housing, and a first bore extending through at least a portion of the outer positioning member, the first bore having a first bore diameter and a first bore axis that is eccentric with respect to the central axis;

an inner positioning member disposed at least partially within the first bore, the inner positioning member having an outer diameter that is approximately equal to the first bore diameter at the point where the positioning device is welded to the housing, and a second bore extending through at least a portion of the inner positioning member, the second bore having a second bore diameter and a second bore axis that is eccentric with respect to the first bore axis, the inner positioning member and the outer positioning member being free to rotate independently of one another about the central axis; and a ferrule extending at least partially through the second bore, the ferrule having an inner diameter, and outer diameter that is approximately equal to the second bore diameter at the point where the positioning device is welded to the housing, and an optical fiber that extends at least partially through the ferrule and is fixedly coupled thereto.

2. The fiber optic module of claim 1, wherein the optical fiber is fixedly coupled to the positioning device.

3. The fiber optic module of claim 2, further comprising:

a target that is attached to the housing such that the inner positioning member and the outer positioning member can be rotated relative to one another to align the optical fiber with the target.

4. The fiber optic module of claim 3, wherein the target extends at least partially into the interior region of the module through the target receiving aperture.

5. The fiber optic module of claim 3, wherein the target comprises a light source.

6. The fiber optic module of claim 5, wherein the light source comprises a laser diode.

7. The fiber optic module of claim 3, wherein the target comprises a light receiver.

8. The fiber optic module of claim 7, wherein the light receiver comprises a photodetector.

9. The fiber optic module of claim 3, wherein the target comprises a second optical fiber.

10. The fiber optic module of claim 1, wherein the positioning device is laser-welded to the housing.

11. The fiber optic module of claim 1, wherein at least one of the inner positioning member and the outer positioning member has a generally frusto-conical shape.

12. The fiber optic module of claim 1, wherein at least one of the inner positioning member and the outer positioning member has a generally cylindrical shape.

13. The fiber optic module of claim 1, wherein at least one of the inner positioning member and the outer positioning member has a knob end via which a user of the positioning device can cause the at least one positioning member to rotate.

14. The fiber optic module of claim 1, wherein each of the inner positioning member and the outer positioning member includes a respective knob end via which a user of the device can cause the respective positioning members to rotate.

15. A fiber optic module, comprising:

a housing having a fiber receiving aperture;

a target that is attached to the housing;

a positioning device that extends through the fiber receiving aperture, said positioning device having a central axis and a bore that extends through the positioning device, the bore having a bore axis that is eccentric with respect to the central axis; and an optical fiber that extends through the bore such that the optical fiber is aligned with the target, wherein the optical fiber is confined within the positioning device and the positioning device is confined within the fiber receiving aperture such that the optical fiber is aligned with the target and remains aligned with the target during an attachment of the positioning device to the housing, wherein the attachment of the positioning device to the housing includes laser welding of the positioning device to the housing.

16. The fiber optic module of claim 15, wherein the positioning device has an outer diameter that is substantially equal to a diameter of the fiber receiving aperture.

17. A method for manufacturing a fiber optic module, the method comprising:

providing a housing that defines an interior region of the fiber optic module;

attaching a target to the housing such that the target extends at least partially into the interior region of the fiber optic module;

attaching a positioning device to the housing such that the positioning device extends at least partially into the interior region of the fiber optic module, said positioning device having a central axis and a bore that extends through the positioning device, the bore having a bore axis that is eccentric with respect to the central axis, wherein attaching the positioning device to the housing comprises laser welding the positioning device to the housing; and fixedly coupling an optical fiber to the positioning device such that the optical fiber extends through the bore and is aligned with the target, wherein the optical fiber is confined within the positioning device and the positioning device is confined relative to the housing such that the optical fiber is aligned with the target and remains aligned with the target during the attachment of the positioning device to the housing.

18. The method of claim 17, further comprising:

rotating at least a portion of the positioning device until the optical fiber is aligned with the target.

19. The method of claim 17, wherein attaching the positioning device to the housing comprises attaching to the housing a positioning device comprising:

an outer positioning member having a first bore extending therethrough, the first bore having a first bore axis that is eccentric with respect to the central axis; and an inner positioning member disposed at least partially within the first bore, the inner positioning member having a second bore extending therethrough, the second bore having a second bore axis that is eccentric with respect to the first bore axis, the inner positioning member and the outer positioning member being independently free to rotate about the central axis.

20. The method of claim 17, further comprising:

rotating a first positioning member to cause an alignment point on the optical fiber to move in a first angular direction; and rotating a second positioning member to cause the alignment point to move in a second angular direction.

21. The method of claim 20, further comprising:

rotating at least one of the first and second positioning member until the optical fiber is aligned with the target.

* * * * *